United States Patent [19]

Swanson et al.

[11] Patent Number: 4,648,644
[45] Date of Patent: Mar. 10, 1987

[54] AUTOMOBILE PROTECTION DEVICE

[76] Inventors: Mark E. Swanson, 22790 Lapaix, Grand Terrace, Calif. 92324; Glen E. Swanson, 1164 Cannon Rd., Riverside, Calif. 92506

[21] Appl. No.: 757,644

[22] Filed: Jul. 22, 1985

[51] Int. Cl.$^4$ ............ B60R 19/38; B60R 19/42
[52] U.S. Cl. ............................ 293/118; 293/128; 293/21
[58] Field of Search ............ 293/1, 21, 22, 102, 293/118, 126, 128

[56] References Cited

U.S. PATENT DOCUMENTS

| | | | |
|---|---|---|---|
| 2,512,527 | 6/1950 | Hoffman | 292/62 |
| 3,718,357 | 2/1973 | Hertzell | 293/9 |
| 4,217,715 | 8/1980 | Bryan, Jr. | 40/591 |
| 4,221,410 | 9/1980 | Dawson | 293/21 |
| 4,437,697 | 3/1984 | Hinojos | 293/128 |

*Primary Examiner*—Robert B. Reeves
*Assistant Examiner*—Dennis H. Pedder
*Attorney, Agent, or Firm*—Klein & Szekeres

[57] ABSTRACT

A protective device for a motor vehicle comprises an elongate guard member having a longitudinal axis oriented substantially parallel to the longitudinal axis of the vehicle. The guard member is variable in length between a contracted position and an extended position. A pivot assembly operatively connects the guard member to the underside of the vehicle so that the guard member can be moved between a lower position and an upper position along the side of the vehicle. As the guard member is raised to its upper position, the pivot assembly acts on the guard member to extend its length to its extended position, while lowering the guard member causes the pivot assembly to contract the guard member to its contracted position. The pivot assembly includes front and rear "L"-shaped pivot members each having a first arm rotatably mounted in a tube attached to the underside of the vehicle, and a second arm pivotably connected to a telescoping, sliding portion of the guard member. A camming mechanism is operatively engageable between the tube and the first arm for rotating the pivot member so as to extend the guard member as the first arm moved axially out of the tube, and so as to shorten the guard member as the first arm is moved axially into the tube.

23 Claims, 7 Drawing Figures

AUTOMOBILE PROTECTION DEVICE

BACKGROUND OF THE INVENTION

The present invention relates generally to the field of devices for protecting automobiles and other motor vehicles from damage to their doors and side panels while parked. More particularly, it relates to such a device which is carried out of the way under the vehicle while the vehicle is being driven, and which can be easily deployed into its operative position when the vehicle is parked.

Many automobiles are provided with a side molding strip along the doors and side panels for the ostensible purpose of protecting these body parts from being dented, nicked, or scratched by the careless opening of the doors of adjacently-parked cars. Frequently, however, these molding strips are more decorative than functional, being so thin and narrow as to offer only a small degree of protection. The amount of protection they offer is further limited by the fact that such molding strips extend only a fraction of an inch from the surface of the car's body.

The use of larger, thicker, more extensively protruding side molding is limited not only by aesthetic considerations, but by aerodynamic factors, since moldings of such size and configuration would considerably increase the drag coefficient of the vehicle, with consequent degradation of performance and fuel mileage.

Consequently, there has been a growing interest in the concept of retractable protective devices which can be carried underneath the vehicle when the device is not in use (as when the vehicle is driven), and which can be deployed into a protective position when the vehicle is parked. Devices of this nature are disclosed in the following U.S. patents:

U.S. Pat. No. 2,512,527—Hoffman
U.S. Pat. No. 3,718,357—Hertzell
U.S. Pat. No. 4,217,715—Bryan, Jr.
U.S. Pat. No. 4,221,410—Dawson
U.S. Pat. No. 4,437,697—Hinojos Despite the development in the art exemplified by the above-mentioned patents, further improvements in this class of automobile protective devices would be desirable. Specifically, the prior art protective devices have tended toward mechanisms that were either mechanically complex, or relatively massive and cumbersome to deploy. The more massive devices, such as that shown in the Hinojos patent, supra, offer a high degree of protection, but at the expense of aesthetics, not to mention the possibility of diminished performance and fuel mileage of the vehicle due to the weight of the device. The less massive devices, as exemplified by the Dawson patent, supra, avoid the disadvantages of heavy weight, but may sacrifice strength and protective qualities.

Thus, it can be seen that there is still an unfulfilled need for a protective device that combines the desirable characteristics of light weight, mechanical simplicity, and high strength with good protective qualities. There would be further advantage to such a device which has these desirable characteristics, yet does not sacrifice aesthetic considerations.

SUMMARY OF THE INVENTION

Briefly, the present invention is a protective device for a motor vehicle, such as an automobile, having a body, and a door in the side of the body. The protective device itself comprises an elongate guard member having a longitudinal axis oriented substantially parallel to the longitudinal axis of the vehicle. The guard member is variable in length between a contracted position of minimum length and an extended position of maximum length. A pivot assembly operatively connects the guard member to the underside of the vehicle so that the guard member can be moved between a lower position and an upper position along the side of the vehicle. As the guard member is raised to its upper position, the pivot assembly acts on the guard member to extend it to its maximum length, while lowering the guard member to its lower position causes the pivot assembly to contract the guard member to its minimum length.

In a specific preferred embodiment described in detail below, the guard member comprises an elongate bar having opposed ends, each of which is slidably received in a tubular sliding element. The two sliding elements are movable toward each other to contract the length of the guard element, and away from each other to extend its overall length. The pivot assembly comprises a pair of "L"-shaped pivot members, each of which has a first arm rotatably received in a mounting tube attached to the underside of the vehicle, and a second arm pivotally connected to one of the sliding elements. The pivot members rotate in the mounting tubes so that their second arms (connected to the sliding elements) pivot in a plane substantially parallel to the longitudinal axis of the guard member. This pivoting action causes the sliding elements to move axially along the bar away from each other when the guard member is raised, and toward each other when the guard member is lowered, thereby extending and contracting, respectively, the overall length of the guard member.

In addition, the preferred embodiment allows the guard member to be concealed in its lowered position by virtue of its unique design of the pivot members and their mounting tubes. Specifically, the aforementioned first arms of the pivot members are received in the mounting tubes so as to be both rotatable and axially slidable therein, with the axis of the mounting units being substantially transverse to the longitudinal axis of the vehicle. A camming mechanism is provided that is operatively engageable between the exterior surface of the pivot member first arms and the interior surface of the mounting tubes, whereby an axially outward sliding of the pivot member arms from the mounting tubes causes the pivot members to rotate so as to raise the guard member and, simultaneously, to move the sliding members thereof axially away from each other to increase the length of the guard member, thereby bringing the guard member to its fully deployed position. Conversely, lowering the guard member causes the sliding elements to move axially toward each other, thereby rotating the pivot members so as to cause the camming mechanism to move the pivot member arms received in the tubes in an axially-inward direction. As a result, in its undeployed, collapsed position, the guard element is concealed underneath the vehicle (by virtue of the axial sliding of the pivot member arms in the mounting units), rather than alongside of the vehicle.

When fully extended in its deployed position, the guard element, optimally, is of sufficient length to extend across the width of the door of the vehicle, thereby blocking the door from any significant degree of opening. This feature allows the present invention to function as a theft-prevention device, as well as a device for protecting the paint and finish of the vehicle body, by the addition of a locking mechanism. Such a locking mechanism may, for example, comprise a locking member that is selectively engageable between one of the sliding elements and an adjacent pivot member to lock the guard member in its deployed position. Engagement and disengagement of the locking member can be accomplished by a conventional lock-and-key mechanism.

The protective device, in accordance with the present invention, can be made of any well-known material that combines structural strength and rigidity with relatively light weight. Aluminum tubing with, advantageously, a coating of plastic material, would be optimal. Steel tubing with, perhaps, chrome plating for aesthetic considerations, might also be considered. Because the major components (the guard member, the pivot members, and the mounting tubes) can be made from hollow tubing, weight can be kept to a minimum.

From the foregoing, it can be seen that the present invention provides a protective device that is mechanically simple and high in strength, with good protective qualities. These advantages are achieved with a structure that can be manufactured so as to be of relatively light weight. Good aesthetic qualities are achieved by the lack of a massive structure, and by the ability of the device to be almost totally concealed beneath the vehicle when not in use. In addition, the device is easily adapted to perform a theft-prevention function by the addition of an optional locking mechanism.

These and other advantages will be more fully appreciated from the detailed description which follows.

DETAILED DESCRIPTION OF A PREFERRED EMBODIMENT OF THE INVENTION

Figure 1:
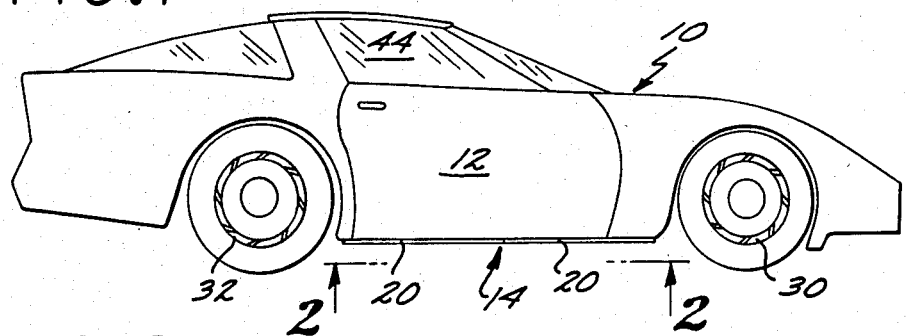
FIG. 1 is a side elevational view of an automobile carrying a protective device, in accordance with the present invention, in its concealed, undeployed position.
Figure 5:
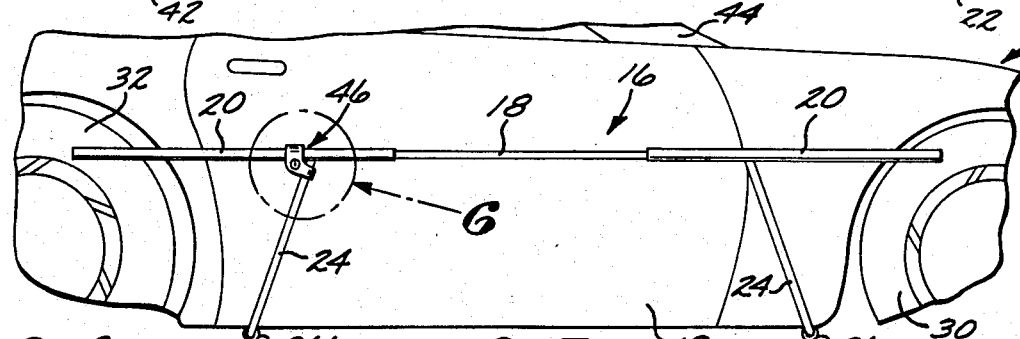
FIG. 5 is a side elevational view of the automobile of FIG. 1, showing the protective device in its fully deployed position.

Referring first to FIGS. 1 and 5, an automobile 10 is shown. The automobile has a body with a door 12 on each side, only one of which is shown in this view. Mounted on the automobile 10 is a protective device 14, in accordance with a preferred embodiment of the present invention. In FIG. 1, the protective device is in its concealed, undeployed position, while in FIG. 5, the device is shown in its fully deployed position. Only one protective device 14 is shown; however, it is to be understood that a protective device 14 is mounted on each side of the automobile.

Figure 2:
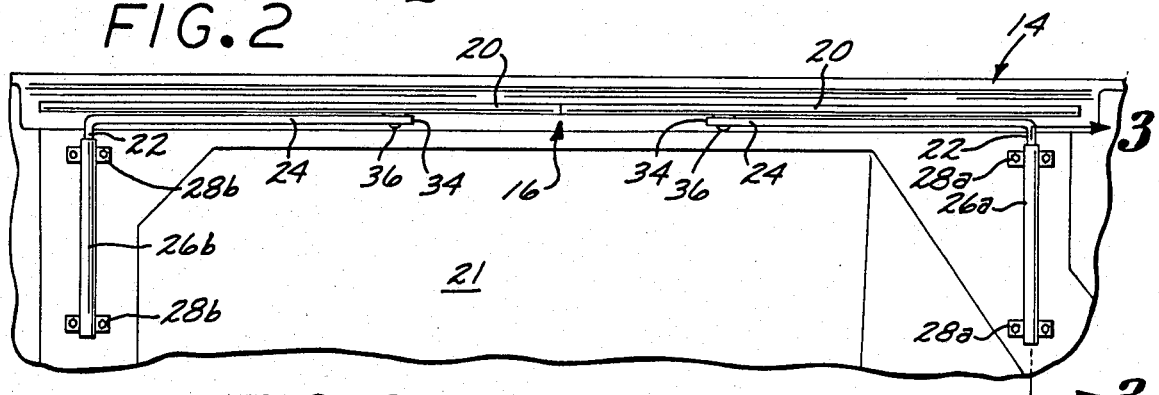
FIG. 2 is a plan view of a portion of the underside of the automobile of FIG. 1, taken along line 2—2 of FIG. 1, showing the protective device in its undeployed position.

As best shown in FIGS. 2 and 5, the protective device 14 comprises an elongate bumper or guard member 16, formed of tubular metal, such as chrome-plated steel or aluminum, for example. A plastic or rubberized coating (not shown) may be added as an option. The guard member 16 has a longitudinal axis that is substantially parallel to the longitudinal axis of the automobile. As best shown in FIG. 5, the guard member 16 comprises an elongate internal bar 18 having two opposed ends, each of which is slidably received in a tubular, externally-fitting, sliding element 20. The sliding elements 20 and the bar 18 have a "telescoping" relationship, with the sliding elements being slidable toward each other on the bar 18 to contract the overall length of the guard member 16, and away from each other to extend the guard member The guard member 16, comprising the bar 18 and the sliding elements 20, is operatively connected to the underside 21 of the automobile by a pivot assembly. The pivot assembly comprises a pair of "L"-shaped pivot members, each having a first arm 22 and a second arm 24. The first arm 22 of one of the "L"-shaped pivot members is rotatably received in a front mounting tube 26a attached by brackets 28a to the underside of the automobile behind the front wheel 30. The other "L"-shaped pivot member has its first arm 22 rotatably received in a rear mounting tube 26b attached by brackets 28b to the underside of the automobile ahead of the rear wheel 32. The mounting tubes 26a and 26b each have a longitudinal axis that is oriented substantially transversely to the longitudinal axis of the automobile.

The second arm 24 of each of the "L"-shaped pivot members is substantially perpendicular to the first arm 22. Each of the second arms 24 terminates in an end 34 that is pivotably connected to one of the sliding elements 20 by means of a pivot pin 36. The pivot member having its first arm 22 mounted in the front mounting tube 26a has its second arm 24 pivotably connected to the forward one of the sliding elements 20, while the pivot member having its first arm mounted in the rear mounting tube 26b has its second arm 24 pivotably connected to the rearward one of the sliding elements 20.

Figure 3:
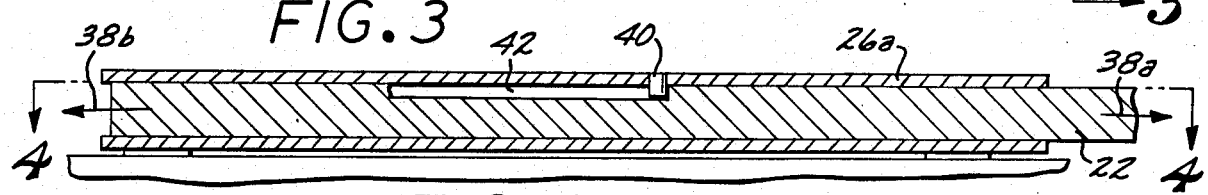
FIG. 3 is a cross-sectional view taken along line 3—3 of FIG. 2.
Figure 4:
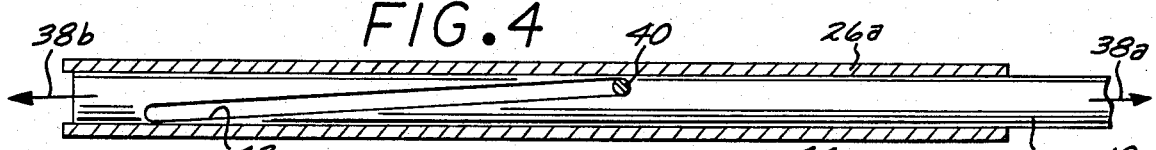
FIG. 4 is a cross-sectional view taken along line 4—4 of FIG. 3.

FIGS. 3 and 4 illustrate the manner in which the pivot member first arms 22 are mounted in the mounting tubes 26a and 26b. Although only the front mounting tube 26a is shown, the description which follows applies equally to the rear mounting tube construction, which is nearly identical to that of the front mounting tube, except as specified below.

As shown in FIGS. 3 and 4, the pivot member first arm 22 is not only rotatably received in the mounting tube 26a, it is axially movable therein in the directions of the arrows 38a and 38b. Movement in the direction indicated by the arrow 38a moves the arm 22 out of the tube 26a, while movement in the direction of the arrow 38b moves the arm 22 into the tube 26a.

As seen in FIG. 3, a pin or button 40 is mounted in the sidewall of the tube 26a so as to extend inwardly therefrom. The pin 40 is received in a helical slot or groove 42 cut into the outer surface of the pivot member first arm 22, as shown in FIG. 4. The pin 40 and the groove 42 function as a camming mechanism, their co-engagement causing the pivot member first arm 22 to rotate in the tube 26a as the arm is moved axially into and out of the tube. The groove 42 is oriented on the front pivot member first arm 22 so as to cause the arm to rotate clockwise as the arm is pulled out of the tube, and counter-clockwise when it is pushed into the tube. On the rear pivot member first arm 22, the groove is oriented for counter-clockwise rotation when pulled out, clockwise rotation when pushed in. (On the other side of the automobile, not shown in the drawings, the orientations of the front and rear grooves 42 are reversed.)

The operation of the protective device 14 may now be readily understood. In the undeployed position, the guard member 16 is carried on the underside 21 of the automobile, as shown in FIGS. 1 and 2. In this undeployed position, the entire protective device 14 is largely concealed underneath the automobile. The guard member 16 is contracted to its minimum length, with the sliding elements 20 being axially drawn toward each other on the internal bar 18 to their position of minimum separation. The internal bar 18 is thus substantially, if not entirely, enclosed within the sliding elements 20.

To deploy the protective device 14, the pivot member first arms 22 are pulled axially out of the mounting tubes 26a and 26b in the direction of the arrows 38a (FIGS. 3 and 4). The axial motion causes the camming mechanism (pin 40 and slot 42) to rotate the pivot member first arms 22, in the manner described above. The rotation of the pivot member first arms 22 causes the pivot member second arms 24 to swing or pivot toward the opposite ends of the automobile. The ends 34 of the pivot member second arms 24, being each pivotably attached to one of the sliding elements 20, thereby move the latter elements axially away from each other to lengthen the guard member 16, while the upward motion of the second arm ends 34 raises the guard member to its deployed position, along the side of the automobile.

In the fully deployed position of the protective device 14 (FIG. 5), the guard member 16 is extended to its maximum length by virtue of the sliding elements 20 having been axially separated by their maximum distance along the internal bar 18, the internal bar thereby being exposed along a major portion of its length. The guard member 16 has also been moved outwardly from beneath the automobile, and upwardly along its side to a position in which it fully extends across the door 12 along a line that is preferably about one-third to one-half the distance between the bottom of the door 12 and the bottom of a window 44 in the door. In its fully deployed position, the protective device 14 preferably has its guard member 16 extending across a sufficient portion of the width of the door 12 to block the door from being opened to any significant degree. When thus deployed, the guard member 16 functions as an effective bumper to protect the door and the side of the car from the minor dents and scratches that frequently result from the door of an adjacently-parked car, for example.

The protective device 14 is returned to its concealed position by reversing the process described above. Specifically, the guard member 16 is moved downwardly along the side of the car, causing the ends 34 of the pivot member second arms 24 to move toward each other, thereby moving the sliding elements 20 axially toward each other along the bar 18, by means of the pivoting action of the pivot pins 36. The pivoting of the second arms 24 causes the pivot member first arms 22 to rotate in the mounting tubes 26a and 26b, and this rotation is translated, by the camming mechanism 40,42 (FIGS. 3 and 4), into an axial movement of the first arms 22 into the tubes 26a and 26b, in the direction of the arrows 38b. The result is that the guard member 16 is contracted to its minimum length by the axial motion of the sliding elements 20 toward each other as the guard member 16 is lowered to a position below the underside 21 of the automobile. Simultaneously, the inward movement of the pivot member first arms 22 causes the entire assembly, including the guard member 16, to return to its concealed position underneath, and adjacent to, the automobile's underside.

An advantage to the present invention resides in the fact that the pivoting movement of the pivot member second arms 24, as the guard member 16 is raised and lowered, is in a plane that is substantially parallel to the longitudinal axis of the automobile. This feature allows the protective device to be deployed even in relatively cramped surroundings, as when another vehicle is parked close by.

Figure 6:
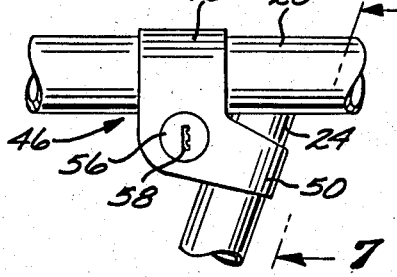
FIG. 6 is a detailed view of the portion of the protective device enclosed within the dashed circle 6 of FIG. 5.
Figure 7:
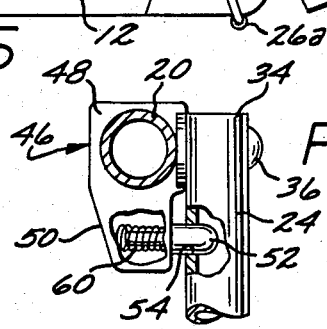
FIG. 7 is a view taken along line 7—7 of FIG. 6, and partially broken away to show the locking mechanism optionally included with the protective device of the present invention.

An optional feature of the present invention is illustrated in FIGS. 6 and 7. In these figures, a lockable latch mechanism 46 is shown lockably connecting one of the sliding elements 20 to its associated pivot member second arm 24. The latch mechanism 46 includes a brace 48 that is attached to the sliding element 20, with an angled portion 50 that is so positioned that the pivot member second arm 24 is closely adjacent to it when the protective device 14 is in its fully deployed position. Extending from the angled portion 50 is a pin 52 that registers with a hole 54 in the pivot member second arm 24 when the protective device is fully deployed. The pin is retracted by the actuation of a lock 56 through the use of a key (not shown) receivable in a keyhole 58 in the lock 56. Thus, the latch mechanism 46 can be used to lock the guard member 16 in its upraised position to block entry into the automobile, and to unlock the guard member 16 when entry is desired by the possessor of the key. In this manner, the protective device 14 can function as a theft deterrent.

Even if the lock 56 is omitted, the latch mechanism can be employed with the pin 52 seating in the hole 54 when the protective device is deployed, thereby securely latching the guard member 16 in its upraised position. To lower the guard member 16, the pin 52 is retracted to release the guard member 16 from the latching mechanism 46. The actuation of the pin 52 can be accomplished by a suitable mechanism, well-known in the art, such as a spring-loaded latch, represented semi-schematically in FIG. 7 by a spring 60.

Thus, there has been described a protective device for an automobile that offers good protection against scratches and minor dents without sacrificing aesthetic appeal. The device is of relatively low mass, and it is mechanically simple, thereby contributing to its economy of manufacture and ease of use. The device, being of small size and light weight, is easily carried underneath the vehicle, substantially, if not totally, concealed. The manner in which the pivoting action takes place in a plane substantially parallel to the longitudinal axis of the automobile allows for use of the device in cramped spaces, as previously described. Finally, by the addition of a lockable latch mechanism, the invention offers significant theft deterrence.

Although a preferred embodiment has been described above, several modifications may suggest themselves to those skilled in the pertinent arts. For example, the camming mechanism that causes the pivot member first arms to rotate in the mounting tubes as they are moved axially in and out of the tubes can take a variety of forms, as can the lockable latching mechanism, shown in FIGS. 6 and 7. The guard member is preferably comprised of tubular elements that are circular in cross-section, but square cross-section elements may be employed if desired. These and other modifications should be considered within the spirit and scope of the invention, as defined by the claims which follow.

What is claimed is:

1. A protective device for a motor vehicle having a body, said device comprising:
   an elongate guard member having a longitudinal axis oriented substantially parallel to the longitudinal axis of said vehicle, said guard member being length-variable along said axis between a contracted position and an extended position; and
   pivot means, having a first member operatively connected to the underside of said vehicle and a second member pivotally connected to said guard member, for movably mounting said guard member to said vehicle for movement between a lower position and an upper position along the side of said vehicle, whereby said guard member is lengthened by said pivot means along said axis from said contracted position to said extended position when said guard member is raised from said lower position to said upper position, and whereby said guard member is shortened by said pivot means along said axis from said extended position to said contracted position when said guard member is lowered from said upper position to said lower position.

2. The protective device of claim 1, further comprising:
   mounting means for rotatably connecting said first member of said pivot means to the underside of said vehicle.

3. The protective device of claim 2, wherein said pivot means comprises a substantially "L"-shaped member having a first arm rotatably mounted in said mounting means.

4. The protective device of claim 1, wherein said guard member comprises:
   an elongate internal element having first and second ends; and
   first and second external elements slidingly fitting over said first and second ends, respectively, of said internal element, whereby said first and second external elements are axially slidable toward and away from each other on said internal element to vary the length of said guard member between said contracted position and said extended position.

5. The protective device of claim 3, wherein said mounting means includes tubular member having a longitudinal axis oriented substantially transversely to the longitudinal axis of said vehicle, and wherein said first arm of said "L"-shaped member is axially movable in said tubular member, and wherein said protective device further comprises:
   camming means, operatively engageable between said tubular member and said first arm of said "L"-shaped member, for rotating said pivot member so as to lengthen said guard member as said first arm is moved axially outwardly in said tubular member, and so as to shorten said guard member when said first arm is moved axially inwardly in said tubular member.

6. The protective device of claim 5, wherein said camming means comprises:
   a helical slot extending along a portion of the length of said first arm of said "L"-shaped member; and
   a pin extending from the interior surface of said tubular member and engageable in said helical slot.

7. The protective device of claim 4, wherein said pivot means comprises:
   front and rear substantially "L"-shaped pivot members each having a first arm rotatably mounted on the underside of said vehicle, said front pivot member having a second arm pivotally connected to said first external element of said guard member, and said rear pivot member having a second arm pivotally connected to said second external element of said guard member.

8. The protective device of claim 7, wherein said first arms of said front and rear pivot members are rotatably retained in front and rear tubular members, respectively, said front and rear tubular members each having a longitudinal axis oriented substantially transversely to the longitudinal axis of said vehicle, said first arms of said pivot members each being axially movable in its associated tubular member, and wherein said protective device further comprises:
   camming means, operatively engageable between each of said tubular members and the pivot member first arm received therein, for rotating said pivot member so as to lengthen said guard member as said first arms are moved axially outwardly in said tubular members, and so as to shorten said guard member as said first arms are moved axially inwardly in said tubular members.

9. The protective device of claim 8, wherein camming means comprises:
   a helical slot extending along a portion of the length of said first arms of each of said pivot members; and
   a pin in each of said tubular members extending from the interior surface thereof so as to be engageable in said helical slot.

10. The protective device of claim 1, further comprising:
    locking means for lockably connecting said guard member to said pivot means when said guard member is in said upper position.

11. The protective device of claim 10, wherein said locking means is lockable and unlockable by a key.

12. A protective device for a motor vehicle having a body and a door in the side of said body, said protective device comprising:
    an elongate guard member having a longitudinal axis oriented substantially parallel to the longitudinal axis of said vehicle, said guard member including an elongate bar having first and second ends slidably received in first and second sliding elements, respectively, said sliding elements being slidable toward and away from each other on said bar to vary the length of said guard element between a contracted position and an extended position; and
    pivot means, operatively connected to the underside of said vehicle, and to each of said first and second sliding elements, for movably mounting said guard member to said vehicle for movement between a lower position and an upper position along the side of said vehicle, whereby said sliding elements are moved away from each other by said pivot means to lengthen said guard member to said extended position when said guard member is raised to said upper position, and whereby said sliding elements are moved toward each other by said pivot means to shorten said guard member to said contracted position when said guard member is lowered to said lower position.

13. The protective device of claim 12, wherein said guard member, when in said extended position, extends across a sufficient portion of the width of the door of said vehicle to block any significant opening of said door.

14. The protective device of claim 12, wherein said pivot means comprises:
   a first "L"-shaped pivot member having a first arm rotatably mounted on the underside of said vehicle and a second arm pivotally connected to said first sliding element;
   a second "L"-shaped pivot member having a first arm rotatably mounted on the underside of said vehicle and a second arm pivotally connected to said second sliding element.

15. The protective device of claim 14, further comprising:
   first and second tubular mounting members attached to the underside of said vehicle, each having a longitudinal axis substantially transverse to the longitudinal axis of said vehicle, said first mounting member receiving said first arm of said first pivot member, said second mounting member receiving said first arm of said second pivot member, said first arms of said first and second pivot members being received in said mounting members so as to be both rotatable and axially movable therein; and
   camming means, operatively engageable between each of said mounting members and the pivot member first arm received therein for rotating said pivot members so as to move said sliding elements away from each other as said first arms move axially outwardly in said mounting members, and so as to move said sliding elements toward each other as said first arms move axially inwardly in said mounting members.

16. The protective device of claim 15, wherein said camming means comprises:
   a helical slot along a portion of the length of each of said pivot member first arms; and
   a pin extending from the interior surface of each of said mounting members so as to be engageable with said slot.

17. The protective device of claim 13, further comprising:
   locking means for releasably locking said guard member in said upper position.

18. The protective device of claim 17, wherein said locking means comprises:
   a locking member movable into and out of a locking engagement between at least one of said sliding elements and the adjacent pivot means; and
   key-actuated means for selectively moving said locking member into and out of said engagement.

19. A protective device for a motor vehicle having a body and a door in the side of said body, said protective device comprising:
   an elongate guard member having a longitudinal axis oriented substantially parallel to the longitudinal axis of said vehicle, said guard member including an elongate bar slidably received in a sliding element, said sliding element being slidable between first and second positions on said bar to vary the length of said guard element respectively between a minimum length and a maximum length; and
   pivot means, having a first member rotatably mounted on the underside of said vehicle and a second member pivotable in a plane substantially parallel to the longitudinal axis of said guard member, said second member being pivotally connected to said sliding element, whereby said second member pivots to move said sliding element from said first position to said second position as said guard member is moved upwardly, and to move said sliding element from said second position to said first position as said guard member is moved downwardly.

20. The protective device of claim 19, wherein said bar of said guard element has first and second ends slidably received in first and second sliding elements, respectively, said sliding elements having a first position of minimum separation from each other and a second position of maximum separation from each other, and wherein said pivot means comprises:
   a first "L"-shaped pivot member having a first arm rotatably mounted on the underside of said vehicle and a second arm pivotally connected to said first sliding element; and
   a second "L"-shaped pivot member having a first arm rotatably mounted on the underside of said vehicle and a second arm pivotally connected to said second sliding element.

21. The protective device of claim 20, further comprising:
   first and second tubular mounting elements attached to the underside of said vehicle, each having a longitudinal axis substantially transverse to the longitudinal axis of said vehicle, said first mounting element receiving said first arm of said first pivot member, said second mounting element receiving said first arm of said second pivot member, said pivot member first arms being received in said mounting elements so as to be both rotatable and axially movable therein; and
   camming means, operatively engageable between each of said mounting elements and the pivot member first arm received therein, for rotating said pivot members so as to move said sliding elements from said first position to said second position as said first arms move axially outwardly in said mounting elements, and so as to move said sliding elements from said second position to said first position as said first arms move axially inwardly in said mounting elements.

22. The protective device of claim 21, wherein said camming means comprises:
   a helical slot along a portion of the length of each of said pivot member first arms; and
   a pin extending from the interior surface of each of said mounting elements so as to be engageable with said slot.

23. The protective device of claim 19, wherein said guard element, when extended to said maximum length, extends across a sufficient portion of the width of said door of said vehicle to block any significant opening of said door, and wherein said protective device further comprises:
   locking means, engageable between said sliding element and said pivot means, for selectively locking said sliding element in said second position.

* * * * *

UNITED STATES PATENT AND TRADEMARK OFFICE
CERTIFICATE OF CORRECTION

PATENT NO. : 4,648,644
DATED : March 10, 1987
INVENTOR(S) : Mark E. Swanson and Glen E. Swanson It is certified that error appears in the above-identified patent and that said Letters Patent are hereby corrected as shown below:

Column 2, line 29, add "." after "member".

Column 4, line 16, change "member" to --member's overall length.--

Column 7, line 51, add "a" after "includes".

Signed and Sealed this

Eleventh Day of August, 1987

Attest:

DONALD J. QUIGG

Attesting Officer

Commissioner of Patents and Trademarks